UNITED STATES PATENT OFFICE.

JOKICHI TAKAMINE, OF NEW YORK, N. Y., AND SADAKICHI SATOW, OF SENDAI, JAPAN.

PROCESS OF OBTAINING PROTEID MATTER FROM CORN.

1,245,818.     Specification of Letters Patent.     Patented Nov. 6, 1917.

No Drawing.     Application filed November 25, 1916. Serial No. 133,311.

*To all whom it may concern:*

Be it known that we, JOKICHI TAKAMINE and SADAKICHI SATOW, both subjects of the Emperor of Japan, and residing, respectively, at New York, in the county and State of New York, and Sendai, Japan, have made a certain new and useful Invention in Process of Obtaining Proteid Matter from Corn, (Case G,) of which the following is a specification.

This invention relates to a process of obtaining proteid matter from corn or other starch containing grain or cereal, and consists substantially in the mode of operation hereinafter set forth and finally pointed out in the appended claims.

In carrying out our invention the corn or other grain or cereal is first ground to a fine meal. The meal may then be sifted to separate out the bran, but this step is not essential, and the meal is cooked with a small amount of water to gelatinize the starch cells contained therein. After cooling the gelatined mass to about 150° F., diastatic substances, such as ground malt with water, koji and water, koji extract, or the like, is added thereto to convert the starch into sugar. The mass is then cooled and yeast added and the whole mass permitted to ferment for a period of from 72 to 96 hours, to change the sugar chiefly into alcohol and carbonic acid gas. The fermented liquor is then distilled to separate out the alcohol. The remaining liquor, called "slop" contains the fibrous material, the protein of the original raw material, the yeast cells and some other products of fermentation which were not distilled off with the alcohol.

This liquor or "slop" is then drained, as by passing the same through bolting cloth, to separate therefrom any insoluble fibers, and other matter, such as yeast cells, and is then permitted to settle, or the proteidal substances separated out by filtration, the liquor being decanted or otherwise removed. If desired or necessary the mass thus obtained may be still further purified of any deleterious soluble matter, or acids contained therein by washing the same in water. This mass which we will call "meal" or "proteid meal" contains the proteidal substances of the original raw material.

The meal produced as above described is then subjected to suitable treatment to refine it. Various refining methods may be employed. According to one method the meal is treated with an alkaline solution, such as a dilute solution of caustic or carbonated alkali, or caustic or carbonated ammonia, the refined proteids being precipitated from the resulting liquid by an acid, such as sulfuric, sulfurous, acetic, or phosphoric, or, if desired, the proteids may be purified, before precipitation, by filtration, centrifuging, fractional precipitation, or after filtration by fractional solution of precipitated impure proteids, or by converting one or more components of the liquid into other chemical compounds with different properties which permit their separation. By thus purifying the liquid a refined proteid product is obtained which is suitable for use in the manufacture of various commercial products, such as food products, celluloid-like substances, varnish, lacquer, artificial leather, artificial rubber and the like.

According to another method the meal is extracted with water and the proteids are precipitated from the resulting liquid either directly or after being purified by physical means, such as filtration, centrifuging and the like, or by chemical means such as by adding caustic or carbonated alkali or caustic or carbonated ammonia, and precipitating subsequently with acid or a ferment, as above described.

According to still another method the meal is treated with an aqueous salt solution, such as sodium chlorid, ammonium sulfate, or the like, and the resulting liquid is further purified, if desired, in the same way as above described, and is then subjected to dialysis.

The refined proteid product produced as above described, whether according to one or another of the methods referred to, is yellowish in color, tasteless, odorless, plastic and sticky when kneaded with alkaline reacting solution or phosphoric acid. It is soluble in all proteid solvents, shows all characteristic reactions of vegetable proteids, and when dissolved in alkalis and acids, respectively, it forms alkali salts and acid salts. It evolves ammonia gas when heated with hydroxid of alkali, or of alkaline earths, and changes into a yellow mass when treated with concentrated nitric acid. It is easily rendered transparent, is adhesive and can be molded into permanent shape.

When treated with suitable solvents it forms derivations of proteids which are flexible, elastic, adhesive, tough and strong.

Having now set forth the objects and nature of our invention, and the method of carrying out the same, what we claim as new and useful, and of our joint invention is,—

1. In the production of vegetable proteids from grain, cereal or the like, the method which consists in grinding the raw material, and cooking the ground mass to gelatinize the starch thereof, then converting the starch constituent into sugar, and fermenting and distilling the mass, then separating the proteidal substances from the remaining liquor in the form of a "meal" and passing the same into a liquid and finally separating the proteidal contents of the liquid.

2. In the production of vegetable proteids from grain, cereal or the like, the method which consists in grinding the raw material, and cooking the ground mass to gelatinize the starch thereof, then converting the starch constituent into sugar, and fermenting and distilling the mass, then separating the proteidal substances from the remaining liquor in the form of a "meal" and passing the same into a liquid and purifying the liquid, and finally separating the proteidal matter from the purified liquid.

3. In the production of vegetable proteids from grain, cereal or the like, and method which consists in grinding the raw material, and cooking the ground mass to gelatinize the starch thereof, then converting the starch constituent into sugar, and fermenting and distilling the mass, then separating the proteidal substances from the remaining liquor in the form of a "meal," and passing the same into a liquid and finally precipitating the proteidal contents of the liquid.

4. In the production of vegetable proteids from grain, cereal or the like, the method which consists in grinding the raw material, and cooking the ground mass to gelatinize the starch thereof, then converting the starch constituent into sugar, and fermenting and distilling the mass, then separating the proteidal substances from the remaining liquor in the form of a "meal" and passing the same into a liquid and finally precipitating with an acid the proteidal contents of the liquid solution.

5. In the production of vegetable proteids from grain, cereal, or the like, the method which consists in grinding the raw material, and cooking the ground mass to gelatinize the starch thereof, then converting the starch constituent into sugar, and fermenting and distilling the mass, then separating the proteidal substances from the remaining liquor in the form of a "meal" and passing the same into a liquid and purifying the liquid, and finally precipitating the proteidal contents of the purified solution.

6. In the production of vegetable proteids from grain, cereal, or the like, the method which consists in grinding the raw material, and cooking the ground mass to gelatinize the starch thereof, then converting the starch constituent into sugar, and fermenting and distilling the mass, then separating the proteidal substances from the remaining liquor in the form of a meal and passing the same into a liquid and purifying the liquid, and finally precipitating with an acid the proteidal contents of the purified solution.

7. In the production of vegetable proteids from grain, cereal, or the like, the method which consists in grinding the raw material, and cooking the ground mass to gelatinize the starch thereof, then converting the starch constituent into sugar, and fermenting and distilling the mass, then separating the proteidal substances from the remaining liquor in the form of a "meal," then treating the meal with an alkaline solution, and precipitating the proteidal matter from the resulting liquid.

8. In the production of vegetable proteids from grain, cereal or the like, the method which consists in grinding the raw material, and cooking the ground mass to gelatinize the starch thereof, then converting the starch constituent into sugar, and fermenting and distilling the mass, then separating the proteidal substances from the remaining liquor in the form of a "meal," then treating the meal with an alkaline solution, and precipitating the proteidal matter from the resulting liquid with an acid.

In testimony whereof we have hereunto set our hands this 21st day of November, A. D. 1916.

JOKICHI TAKAMINE.
SADAKICHI SATOW.